US011089220B2

(12) United States Patent
Cha et al.

(10) Patent No.: US 11,089,220 B2
(45) Date of Patent: Aug. 10, 2021

(54) ELECTRONIC TEST DEVICE, METHOD AND COMPUTER-READABLE MEDIUM

(71) Applicant: SAMSUNG ELECTRONICS CO., LTD., Suwon-si (KR)

(72) Inventors: Sungho Cha, Anyang-si (KR); Sungsu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/738,620

(22) Filed: Jan. 9, 2020

(65) Prior Publication Data

US 2020/0351444 A1    Nov. 5, 2020

(30) Foreign Application Priority Data

May 2, 2019  (KR) .................. 10-2019-0051535
Aug. 30, 2019  (KR) .................. 10-2019-0107475

(51) Int. Cl.
*H04N 5/232*  (2006.01)
*H04N 5/247*  (2006.01)
*H04N 17/00*  (2006.01)

(52) U.S. Cl.
CPC ....... *H04N 5/23267* (2013.01); *H04N 5/2328* (2013.01); *H04N 5/247* (2013.01); *H04N 17/002* (2013.01)

(58) Field of Classification Search
CPC .... H04N 5/23264; G01M 7/02; A61H 39/007
See application file for complete search history.

(56) References Cited

U.S. PATENT DOCUMENTS 5,740,471 A * 4/1998 Terui ............... G02B 27/646
                                                  348/E5.046
6,876,957 B1* 4/2005 Stewart ............... G01M 7/022
                                                  702/42
(Continued)

FOREIGN PATENT DOCUMENTS

CN    106559615 A    4/2017
JP    2009-211023 A    9/2009
(Continued)

OTHER PUBLICATIONS

Communication dated Oct. 21, 2020, from the European Patent Office in counterpart European Application No. 20172583.5.
(Continued)

*Primary Examiner* — Paulos M Natnael
(74) *Attorney, Agent, or Firm* — Sughrue Mion, PLLC

(57) ABSTRACT

A method of evaluating performance of an electronic device that includes a camera is provided. The method includes: setting, by at least one processor, operating conditions of at least one shaker by accessing a database associating a plurality of imaging environments with the operating conditions; acquiring, by the at least one processor, images of a subject from the electronic device, the images being captured while the at least one shaker is operating according to the operating conditions; identifying, by the at least one processor, evaluation scores that correspond to a plurality of characteristics for each of the images; and identifying, by the at least one processor, the performance of the electronic device compensating for the operating conditions of the at least one based on the based on the evaluation scores.

18 Claims, 15 Drawing Sheets

(56) References Cited

U.S. PATENT DOCUMENTS

| | | |
|---|---|---|
| 7,856,172 B2 * | 12/2010 | Nishi ................ H04N 5/23248 |
| | | 396/52 |
| 8,896,715 B2 | 11/2014 | Wu et al. |
| 9,077,902 B2 | 7/2015 | Hoshino |
| 9,179,060 B2 | 11/2015 | Safaee-Rad et al. |
| 2010/0134639 A1 | 6/2010 | Takeuchi |
| 2011/0109752 A1 | 5/2011 | Lee |
| 2011/0228102 A1 | 9/2011 | Hashi et al. |
| 2014/0247369 A1 * | 9/2014 | Kusaka ................ H04N 17/002 |
| | | 348/208.1 |
| 2014/0331774 A1 | 11/2014 | Ohara et al. |
| 2014/0362240 A1 | 12/2014 | Klivington et al. |
| 2015/0189183 A1 | 7/2015 | Johansson et al. |
| 2016/0044246 A1 * | 2/2016 | Yamada ................... G03B 5/08 |
| | | 348/349 |
| 2017/0195575 A1 | 7/2017 | Grundmann et al. |
| 2018/0053310 A1 * | 2/2018 | Liu ....................... G01M 7/025 |
| 2018/0122379 A1 * | 5/2018 | Sohn ....................... G10L 17/22 |

FOREIGN PATENT DOCUMENTS

| | | |
|---|---|---|
| JP | 2011-164413 A | 8/2011 |
| KR | 10-2010-0009064 A | 1/2010 |
| KR | 10-2016-0005203 A | 1/2016 |

OTHER PUBLICATIONS

Kim HyungKwan et al. "Performance Prediction of Optical Image Stabilizer using SVM for Shaker-free Production Line" Proceedings of SPIE, vol. 9896, Apr. 29, 2016, (8 pages total).

* cited by examiner

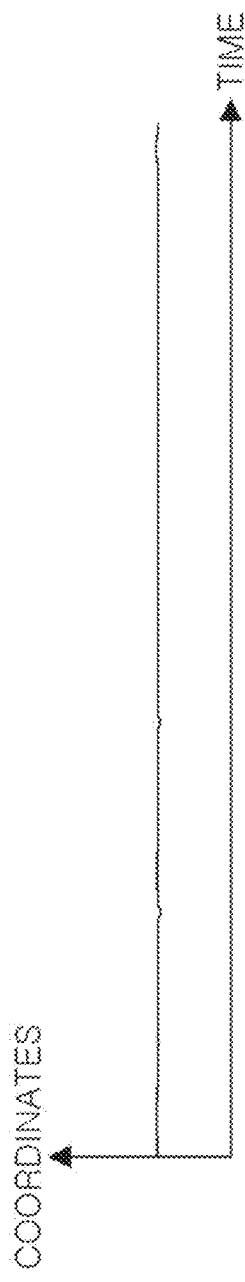
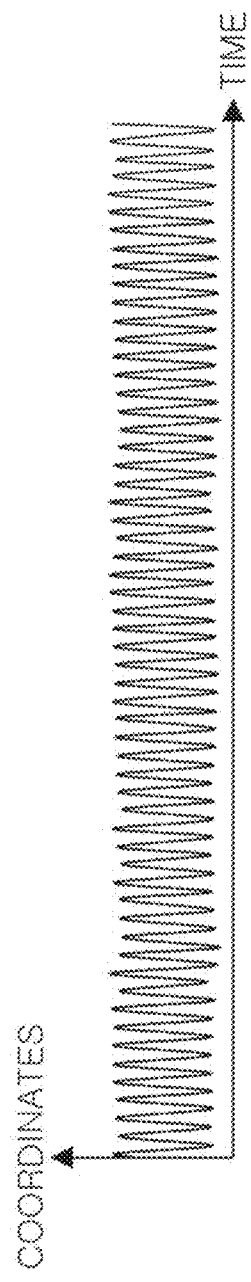
FIG. 11A
FIG. 11B

ELECTRONIC TEST DEVICE, METHOD AND COMPUTER-READABLE MEDIUM

CROSS-REFERENCE TO RELATED APPLICATIONS

This application claims priority from Korean Patent Application No. 10-2019-0051535 filed on May 2, 2019, in the Korean Intellectual Property Office and Korean Patent Application No. 10-2019-0107475 filed on Aug. 30, 2019, in the Korean Intellectual Property Office, the disclosures of which are incorporated herein by reference in their entireties.

BACKGROUND

1. Field

Apparatuses and methods consistent with embodiments evaluating performance of an electronic device.

2. Related Art

Image sensors are semiconductor-based elements that generate electric signals based on incident light, and may be mounted in cameras. Raw data output by image sensors is processed by image signal processors (ISPs) to be output as resultant images. Recently, to provide an optimal resultant image in various imaging environments, some electronic devices are equipped with an image sensor and an algorithm for compensating for motion to provide the optimal image.

SUMMARY

One or more embodiments provide a method of evaluating performance of an electronic device capable of quantitatively measuring performance of a camera and/or a motion compensation algorithm mounted in an electronic device, using a resultant image obtained by applying vibrations to an electronic device including a camera.

According to an aspect of an embodiment, a method of evaluating performance of an electronic device including a camera is provided. The method includes: setting, by at least one processor, operating conditions of at least one shaker by accessing a database associating a plurality of imaging environments with the operating conditions; acquiring, by the at least one processor, images of a subject from the electronic device, the images being captured while the at least one shaker is operating according to the operating conditions; identifying, by the at least one processor, evaluation scores that correspond to a plurality of characteristics for each of the images; and identifying, by the at least one processor, the performance of the electronic device compensating for the operating conditions of the at least one based on the based on the evaluation scores.

According to an aspect of an embodiment, a method of evaluating performance of an electronic device including a camera that is configured to output a stabilized image by capturing an image of a subject with the camera using an image stabilization function is provided. The method includes: setting, by at least one processor, imaging environments of the electronic device; repeatedly implementing, by the at least one processor, the imaging environments in a test equipment including at least one shaker; repeatedly controlling, by the at least one processor, the electronic device to output stabilized images using the camera and the image stabilization function in the imaging environments; and evaluating, by the at least one processor, performance of the electronic device based on the stabilized images.

According to an aspect of an embodiment, there is provided a method of evaluating performance of an electronic device based on a stabilized image output by the electronic device. The method includes: acquiring, by at least one processor, the stabilized image, the stabilized image including a plurality of frames and being output by the electronic device using an image stabilization function; identifying, by the at least one processor, a coordinate change and a vibration frequency of at least one pixel included in the plurality of frames, and a size difference between the plurality of frames and image frames of an original image; converting, by the at least one processor, each of the coordinate change, the vibration frequency and the size difference into an evaluation score, the evaluation score being greater than or equal to a first reference value and less than or equal to a second reference value; and identifying, by the at least one processor, a performance index based on a predetermined weight corresponding to the evaluation score of each of the coordinate change, the vibration frequency and the size difference.

BRIEF DESCRIPTION OF DRAWINGS

The above and other aspects, features, and advantages will be more clearly understood from the following detailed description, taken in conjunction with the accompanying drawings, in which:

FIGS. 11A and 11B are diagrams illustrating a method of evaluating performance of an electronic device according to an embodiment;

DETAILED DESCRIPTION

Hereinafter, embodiments will be described with reference to the accompanying drawings.

Figure 1:
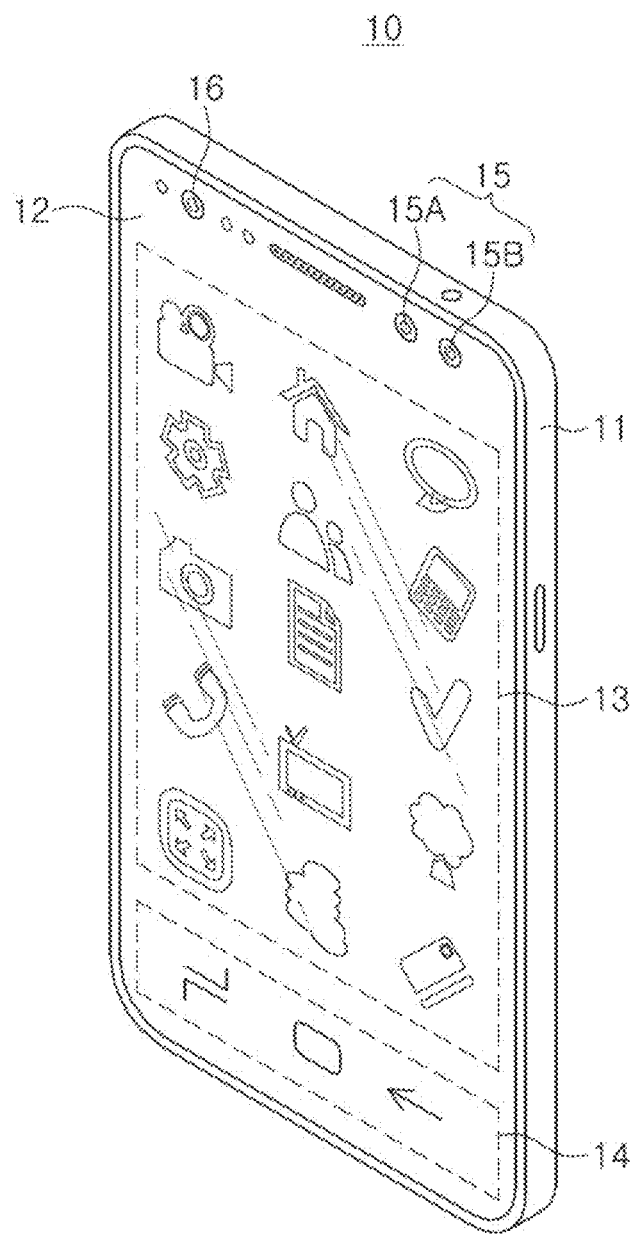
FIGS. 1 and 2 are schematic perspective views illustrating an electronic device according to an embodiment.
Figure 2:
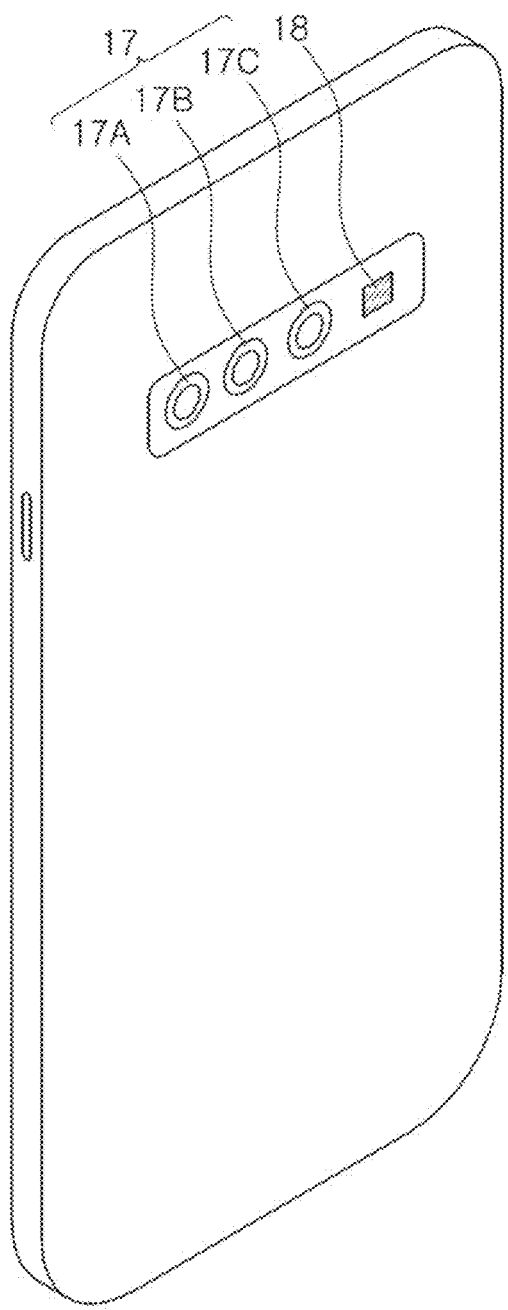

FIGS. 1 and 2 are schematic perspective views illustrating an electronic device according to an embodiment.

Referring to FIGS. 1 and 2, according to an embodiment, an electronic device 10 may be a mobile device such as a smartphone. However, the electronic device 10 according to an embodiment is not limited to a mobile device, and may include different devices that include a camera.

The electronic device 10 may include a housing 11, a display 12, cameras 15 and 16, and the like. In an embodiment, the display 12 may substantially cover the entire front surface of the housing 11, and may include a first region 13 and a second region 14. The first region 13 and the second region 14 may vary depending on an operation mode of the electronic device 10 or an application being executed. The display 12 may be integrated with a touch sensor that senses a user's touch input.

For example, camera 15 may be a general camera 15, and camera 16 may be a time-of-flight (ToF) camera 16. However, embodiments are not limited thereto. The general camera 15 may include a first camera 15A and a second camera 15B. The first camera 15A and the second camera 15B may be implemented by image sensors and lenses having different angles of view, different aperture values, and different numbers of pixels. Due to the limited thickness of the housing 11, it may be difficult for a zoom lens capable of adjusting an angle of view and an aperture value to be employed in the general camera 15. Accordingly, the first camera 15A and the second camera 15B having different angles of view and/or aperture values may provide an image capturing function that meets various needs of a user in an embodiment.

The ToF camera 16 may be combined with a separate light source, such as an infrared light source, to generate a depth map or the like. The ToF camera 16 may provide a face recognition function and the like, and may operate in combination with the infrared light source.

FIG. 2 illustrates a rear surface of the electronic device 10. As illustrated, a camera 17 and a light emitter 18 may be disposed on the rear surface. Similarly to the camera 15 disposed on the front surface of the electronic device 10, the camera 17 may include a plurality of cameras 17A, 17B and 17C which are different in at least one of an aperture value, an angle of view and a pixel number of an image sensor. The light emitter 18 may include a light emitting diode (LED) or the like as a light source, and may operate as a flash to be used in conjunction with operation of the camera 17.

Although the electronic device 10 is described as including cameras 15, 16 and 17, embodiments are not limited thereto and additional cameras may be included to provide various image capturing functions.

Movement between the focus of an image and the electronic may exist due to movement of the focus of an image or movement of the electronic device 10. Such much movement while the electronic device 10 captures an image may result in a degraded image, thereby degrading the quality. To prevent the occurrence of this problem, the electronic device 10 may include an image stabilizer to compensate for the shaking to improve image quality using different correction methods. For example, a motion sensor may be included in the electronic device 10, and the electronic device 10 may compensate for the shaking of the captured image, using information collected by the motion sensor. Alternatively, an optical image stabilizer (OIS), an electronic image stabilizer (EIS) and the like, may be embedded in the cameras 15 to 17 to compensate for the shaking.

Various image stabilizers may also have advantages and disadvantages. For example, while EIS has the advantage of compensating for shaking of an image without adding a separate module to the cameras 15 to 17, a resolution of the image may be reduced in the process of compensating for the shaking. While OIS may compensate for shaking without loss of resolution of an image, OIS has a disadvantage, in that a separate module capable of moving a lens and/or an image sensor included in the cameras 15 to 17 is required. Therefore, a method for accurately evaluating which image stabilizer provides the most appropriate and optimized performance to the electronic device 10 may be required.

In an embodiment, a performance evaluation method may replace a qualitative evaluation method that may reflect the subjectivity of a person. For example, to evaluate the performance of the image stabilizer, a plurality of evaluation items are set, and with respect to a plurality of respective evaluation items, a first reference value may be obtained from an image in which the shaking is minimally reflected and a second reference value may be obtained from an image in which the shaking is most reflected.

In an embodiment, the image stabilizer is mounted in the electronic device 10, and measurement values with respect to the plurality of evaluation items may be obtained from an image output by the electronic device 10 while applying vibrations to the electronic device 10. An evaluation score for respective evaluation items may be obtained by comparing the measurement values with the first reference value and the second reference value. Because the evaluation score is represented by a numerical value, the correction performance of the image stabilizer used in the electronic device 10 may be objectively and qualitatively evaluated.

Figure 3:
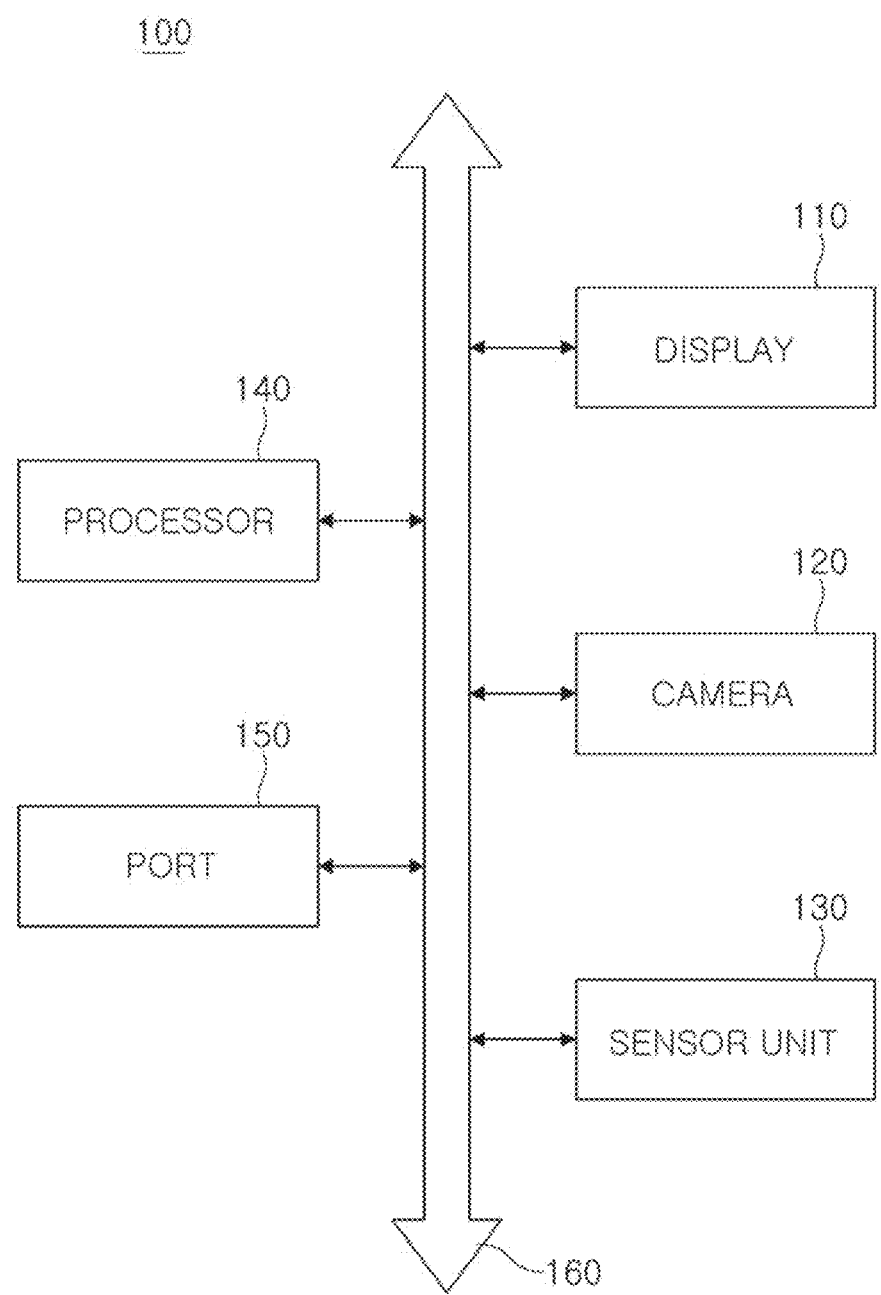
FIG. 3 is a block diagram schematically illustrating an electronic device according to an embodiment.

FIG. 3 is a block diagram schematically illustrating an electronic device according to an embodiment.

Referring to FIG. 3, an electronic device 100 according to an embodiment may include a display 110, a camera 120, a sensor 130, a processor 140, a port 150, and the like. In addition, the electronic device 100 may further include a wired/wireless communication device, a power supply device and the like. Among the components illustrated in FIG. 3, the port 150 may be a device provided to enable the electronic device 100 to communicate with other external devices. As described above, the electronic device 100 may be understood to include various other devices including the camera 120 in addition to a mobile device such as a smartphone, a tablet PC and the like.

The processor 140 may perform a specific operation, an instruction, a task, or the like. The processor 140 may be a central processing unit (CPU), a microprocessor unit (MCU), a system on a chip (SoC), an application processor (AP), or the like, and may communicate with other devices connected to the port 150, as well as the display 110, the camera 120 and the sensor 130, through a bus 160.

According to embodiments, the camera 120 included in the electronic device 100 may include a plurality of cameras, and the plurality of cameras may have different angles of view, aperture values and numbers of pixels. The electronic device 100 may include the image stabilizer for compensating for shaking of an image captured by the camera 120, thereby improving an image capturing function. As an example, the image stabilizer may include an OIS, an EIS, and the like. Alternatively, the image stabilizer may synchronize a motion sensor included in the sensor 130 with the camera 120, and may compensate for shaking of an image using information of motion detected in real time by the motion sensor.

In an embodiment, a performance evaluation method in which performance of the image stabilizer employed in the electronic device 100 may be numerically evaluated to compensate for shaking of the image is provided. The image stabilizer may include a hardware module connected to the camera 120 and/or a software program executed in the processor 140 or the like.

Figure 4:
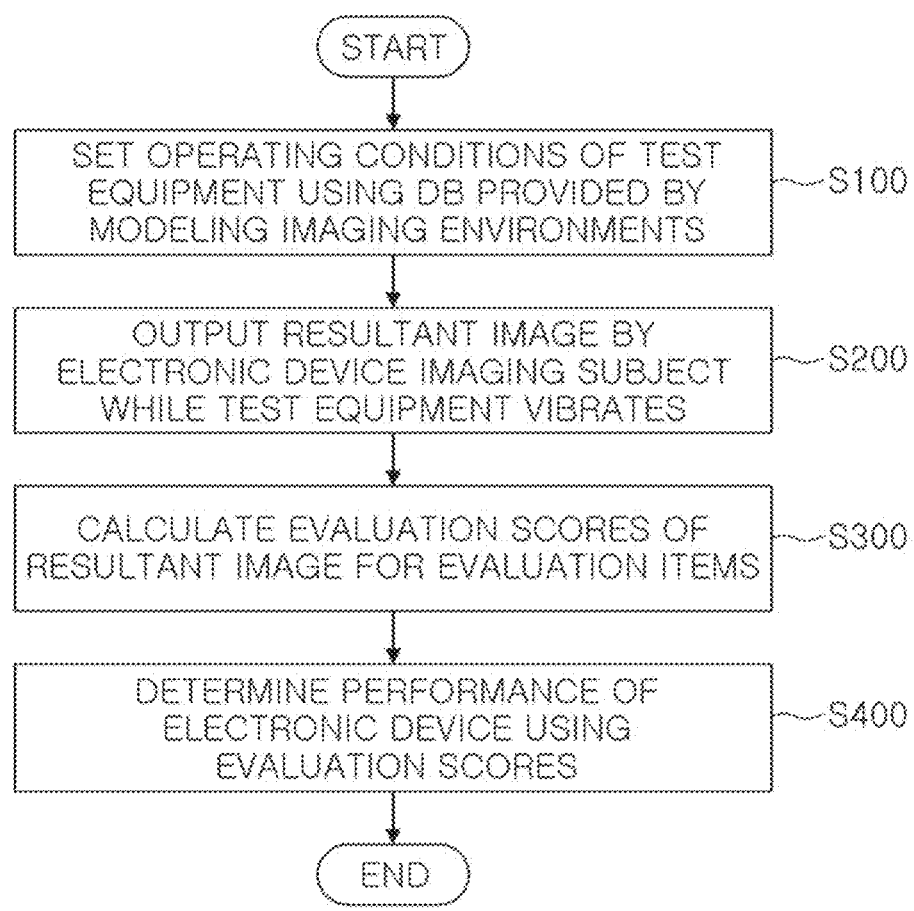
FIGS. 4 to 6 are flowcharts illustrating a method of evaluating performance of an electronic device according to an embodiment.
Figure 5:
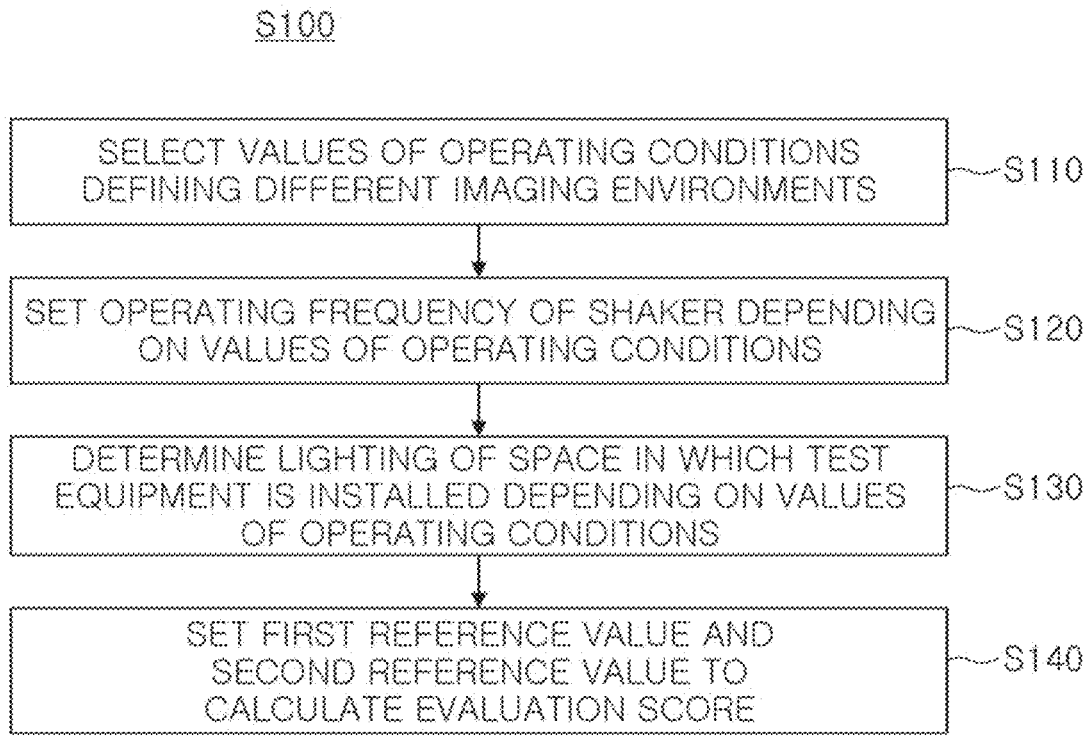
Figure 6:
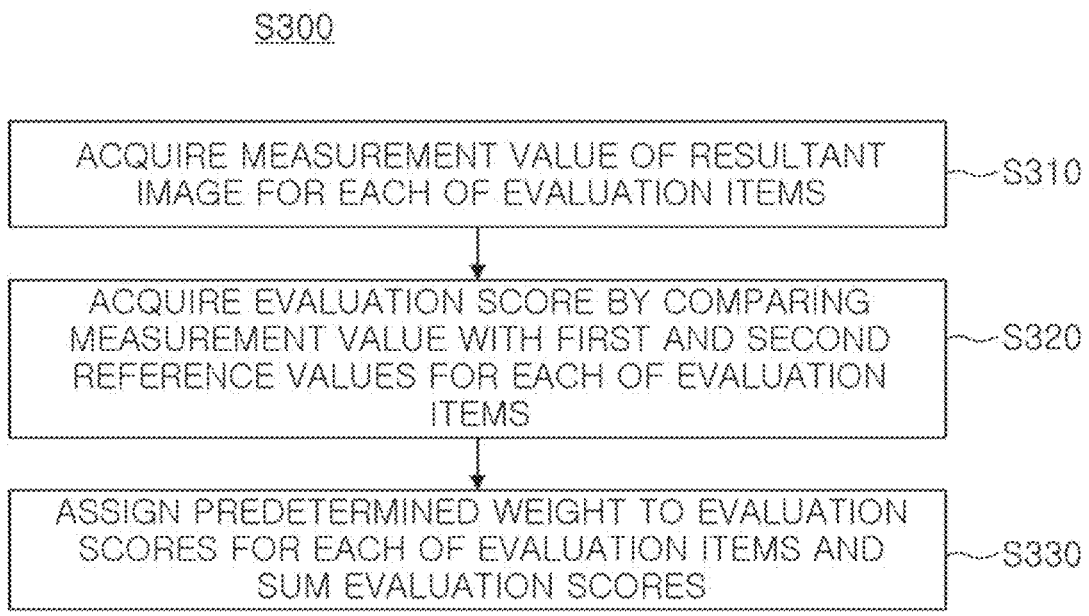

FIGS. 4 to 6 are flowcharts illustrating a method of evaluating performance of an electronic device according to an embodiment.

First, referring to FIG. 4, a method of evaluating performance of an electronic device according to an embodiment may include setting operating conditions of test equipment using a database DB provided by modeling imaging environments (S100). In operation S100, the imaging environments may refer to surrounding environments when images are captured using the electronic device. In an embodiment, operating conditions for determining an environment when a user photographs an image using an electronic device, such as ambient light intensity, color temperature, and the degree of shaking reflected in the electronic device, may be modeled and stored in a database. As an example, the imaging environments may be modeled and stored in the database as illustrated in Table 1 below. Because operating conditions of the test equipment are set with reference to the modeled database as illustrated in Table 1, the imaging environments may be respectively and repeatedly implemented in the test equipment.

TABLE 1

| Imaging Environment | Illumination Intensity (1x) | Color Temperature (K) | Degree of Shaking |
|---|---|---|---|
| Situation of running in downtown area in daytime | 1000 | 5000-6500 | Running |
| Walking situation at night | 63 | 5000-6500 | Walking |
| Standing situation indoors | 250 | 5500 | Hand-Shake |
| Situation of looking outside from running car | 1000 | 5500 | Running Car |
| Walking situation at sunset | 63 | 2300 | Walking |
| Walking on beach | 100000 | 7000 | Walking |

Referring to Table 1, operating conditions such as illumination intensity, color temperature, and degree of shaking may vary depending on imaging environments. However, Table 1 is merely an example, and various other operating conditions not included in Table 1 may be additionally used for modeling the imaging environments.

For example, when comparing the situation of running in a downtown area in the daytime and the situation of walking at night, the degree of illumination intensity and shaking may be different. Also, when comparing three imaging environments of walking at night, walking at sunset, and walking on the beach, the degree of shaking may be similar, but illumination intensity and color temperature may be different. In operation S100, at least one of imaging environments stored in a database may be selected, and test equipment may be set depending on operating conditions corresponding to a selected imaging environment. For example, when the situation of running in a downtown area in the daytime is selected as the imaging environment, the test equipment may vibrate at a higher frequency than when a nighttime walking situation is selected, and the illumination intensity of ambient light may be set to be relatively brighter while the electronic device mounted on the test equipment images a subject.

When the operating conditions are set in operation S100, the test equipment may be controlled to vibrate according to the operating conditions, and the electronic device may controlled to image the subject and output a resultant image (S200). The electronic device may image the subject while being mounted on the test equipment including at least one shaker for applying vibration. The electronic device may include an image stabilizer, which is implemented by a hardware module and/or a software program, and may activate the image stabilizer while imaging a subject, thereby correcting an effect due to vibration of the test equipment.

When a resultant image is output, evaluation scores of the resultant image for predetermined evaluation items may be calculated (S300). The evaluation items may include a first evaluation item corresponding to a change in coordinates appearing in pixels of the resultant image due to shaking. In addition, the evaluation items may include a second evaluation item corresponding to a difference in the size of the resultant image and the size of an original image before the image stabilization is applied.

For example, the first evaluation item may include a first coordinate change item corresponding to a coordinate difference between pixels included in first and second image frames continuously included in the resultant image and/or a second coordinate change item corresponding to the variance of a coordinate difference appearing in pixels of image frames included in the resultant image. In addition, the first evaluation item may include a vibration evaluation item that is determined by a vibration frequency that appears in the pixels of the resultant image. The second evaluation item may be an item corresponding to the size ratio of the resultant image and the original image when the image stabilizer crops the original image to generate the resultant image.

The evaluation scores may be determined based on a first reference value and a second reference value preset for each of the evaluation items. For example, the first reference value may correspond to a lowest score that the evaluation score may have in each of the evaluation items, and the second reference value may correspond to a highest score that the evaluation score may have in each of the evaluation items.

For example, in the vibration evaluation item, the first reference value may be four times an operating frequency of a shaker, and the second reference value may be the operating frequency of the shaker. In the above example, when the vibration frequency appearing in the pixels of the resultant image is four times or more the operating frequency of the shaker, for example, the first reference value or more, the evaluation score may be determined as a lowest score. When the vibration frequency appearing in the pixels of the resultant image is the operating frequency of the shaker or lower, for example, the second reference value or lower, the evaluation score may be determined as a highest score.

For example, in an embodiment, the evaluation scores for evaluation items may be calculated, by comparing values actually obtained from the resultant image with respect to respective evaluation items, with the first reference value and the second reference value, respectively. The first reference value and the second reference value may be predetermined before the test begins. A method of determining the first reference value and the second reference value will be described later with reference to FIG. 5.

When the evaluation scores with respect to the evaluation items are calculated in operation S300, the performance of the electronic device may be determined using the evaluation scores (S400). The performance of the electronic device evaluated in operation S400 may be the performance of the image stabilizer in correcting a shake of the camera imaging a subject and/or an original image output by the camera and generating the resultant image.

Hereinafter, referring to FIG. 5, the operation S100 performed before the operation of outputting the resultant image while the electronic device is mounted on the test equipment and the test equipment vibrates will be described in more detail.

Referring to FIG. 5, the operation S100 may be started by selecting values of operating conditions defining different imaging environments (S110). In operation S110, as illustrated in Table 1, one of the imaging environments stored in the database may be selected, and values of operating conditions corresponding to the selected imaging environment may be extracted from the database.

Next, depending on the values of the operating conditions extracted from the database in operation S110, an operating frequency of the shaker included in the test equipment may be determined (S120). The shaker included in the test equipment may be controlled to shake at the operating frequency. The operating frequency of the shaker may correspond to the vibration frequency of shaking to be applied to the electronic device using the test equipment. As an example, the operating frequency of the shaker may vary depending on the degree of shaking defined in the database of Table 1, and the operating frequency of the shaker when the situation of running in a downtown area in the daytime is selected may be greater than the operating frequency of the shaker when the situation of waling on the beach is selected.

In addition, depending on the values of operating conditions extracted from the database, the lighting of the space in which the test equipment is installed may be determined (S130). For example, when a situation of standing indoors is selected, the lighting of the space in which the test equipment is installed may be determined to be an illumination having an illumination intensity of 250 lx and a color temperature of 5500 K. When the situation of walking at sunset is selected, the lighting of the space in which the test equipment is installed may be determined to be illumination having an illumination intensity of 63 lx and a color temperature of 2300 K. According to embodiments, operations S120 and S130 may be executed simultaneously, or operation S130 may be executed first.

When the operating frequency of the shaker included in the test equipment and the lighting of the space in which the test equipment is installed are determined, the first reference value and the second reference value for calculating the evaluation score for each of the evaluation items may be determined (S140). For example, the first reference value and the second reference value may be determined in an operating frequency of the shaker determined in operations S110 to S130 and an environment in which lighting is set.

As described above, in each of the evaluation items, the first reference value may be a value corresponding to a lowest score for the evaluation score, and the second reference value may be a value corresponding to a highest score for the evaluation score. For example, to obtain the first reference value for each of the evaluation items, the shaker is turned on at the operating frequency determined in operation S120 to vibrate the test equipment, and while the test equipment is vibrating, the image stabilizer of the electronic device is deactivated and an image of the subject is captured, thereby obtaining a resultant image. The first reference value for each of the evaluation items may be determined using the resultant image obtained in the state in which the test equipment vibrates and the image stabilizer of the electronic device is deactivated.

To obtain the second reference value for each of the evaluation items, the resultant image may be obtained by imaging a subject while the shaker is turned off and the image stabilizer of the electronic device is deactivated. For example, the state in which the shaker is turned off and the image stabilizer of the electronic device is deactivated may be defined as a vibration-free condition. The second reference value for each of the evaluation items may be determined from the resultant image output by the electronic device under the vibration-free condition. The first reference value and the second reference value may be determined from an image of imaging the same subject.

The first reference value and the second reference value may be predetermined with respect to each of the imaging environments and stored in a database. For example, the imaging environments according to the embodiment illustrated in Table 1 may be respectively different in at least one of degrees of illumination intensity, color temperature, and a shake degree. Therefore, in different imaging environments, the first reference value and the second reference value that the evaluation score for each of the evaluation items may have may also be different. In an embodiment, the first reference value and the second reference value applied to the evaluation items in each of the imaging environments may be previously determined and stored in the database.

Next, the operation S300 of calculating an evaluation score from the resultant image of the electronic device will be described in more detail with reference to FIG. 6.

Referring to FIG. 6, the calculating of the evaluation score may be started by obtaining a measurement value of the resultant image for each of the evaluation items (S310). As described above, the evaluation items may include coordinate change items corresponding to the coordinate change of image frames included in the resultant image, vibration evaluation items corresponding to the ratio of the vibration frequency appearing in the pixels of the resultant image and the operating frequency of the shaker, and an evaluation item corresponding to the size difference between the original image before the image stabilization is applied and the resultant image. The test equipment may be linked with a computer device capable of executing an image processing task, and the computer device may receive resultant images from an electronic device mounted on the test equipment to obtain measurement values for evaluation items.

The computer device may obtain an evaluation score by comparing the measurement value with the first reference value and the second reference value for each of the evaluation items (S320). As described above, the first reference value may be a lowest score that the evaluation score may have in each of the evaluation items, and the second reference value may be a highest score that the evaluation score may have in each of the evaluation items. Accordingly, the measurement value for each of the evaluation items in operation S320 may be converted into an evaluation score.

A predetermined weight may be assigned to the evaluation score for each of the evaluation items, and the evaluation scores may be weighted and summed, thereby calculating a final performance index (S330). The weights given to the evaluation items may be variously adjusted according to embodiments, and a relatively higher weight may be given to an evaluation item that is regarded to be important by an operator who evaluates the performance of an electronic device.

Figure 7:
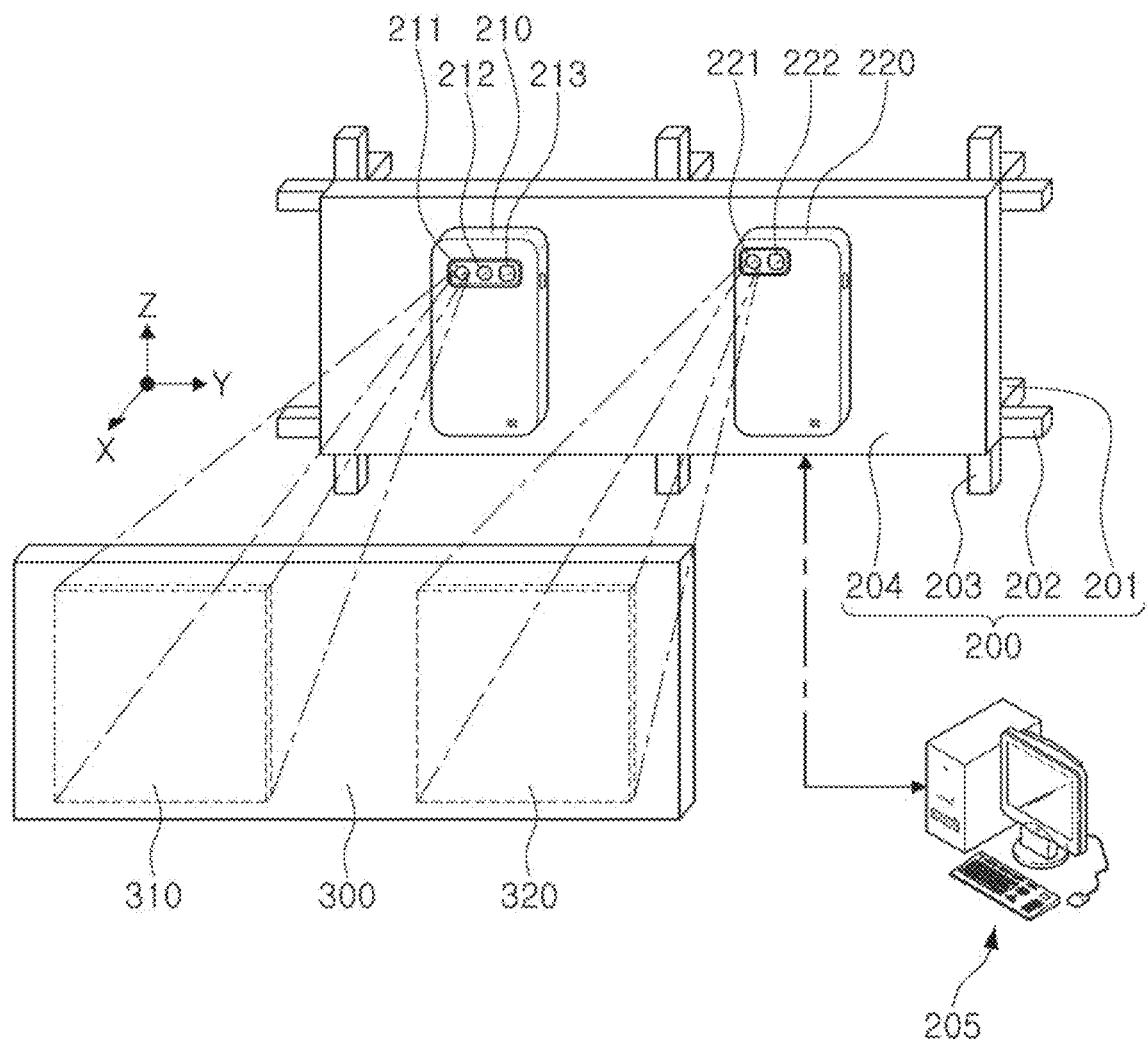
FIGS. 7 and 8 are views illustrating operations of test equipment according to an embodiment.
Figure 8:
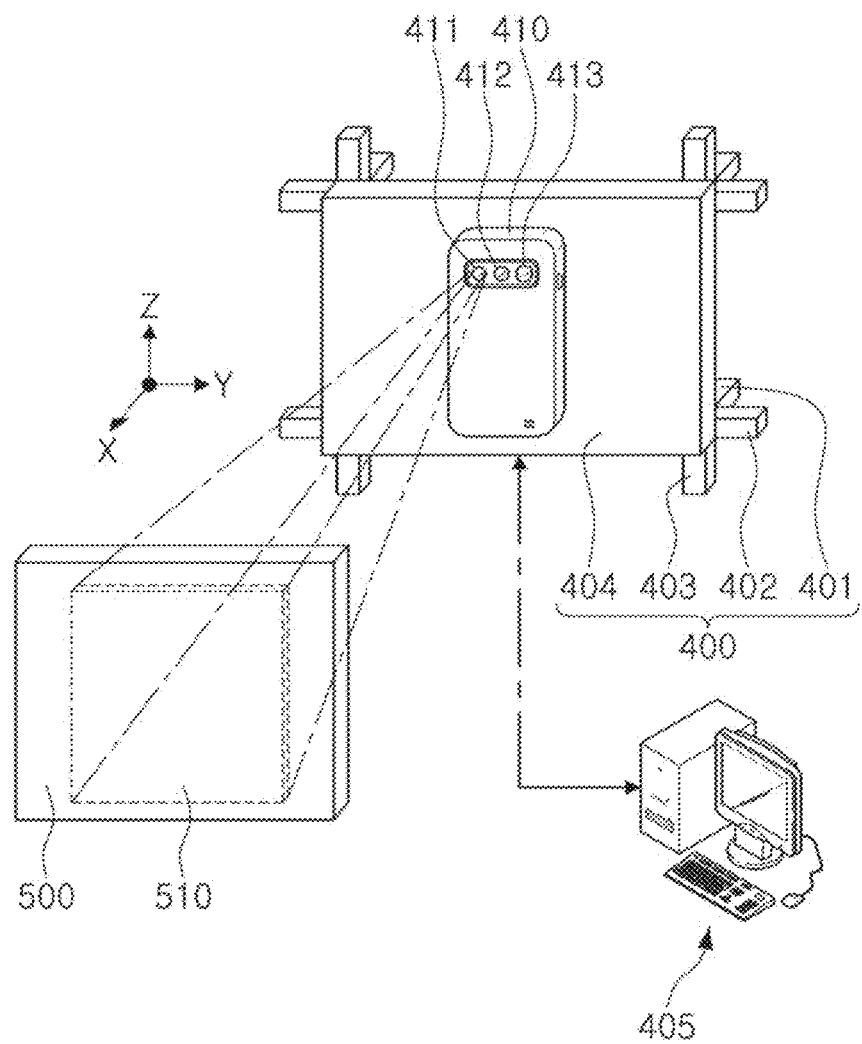

FIGS. 7 and 8 are views illustrating the operation of test equipment according to an embodiment.

First, referring to FIG. 7, test equipment 200 according to an embodiment may include a plurality of shakers 201 to 203, a support 204 and the like. One or more electronic devices 210 and 220 may be fixed to the support 204.

The plurality of shakers 201 to 203 may be connected to portions of the support 204 provided in different positions and may vibrate the support 204 along a plurality of axes. For example, first shakers 201 may vibrate the support 204 in a first direction (an X-axis direction), and second shakers 202 may vibrate the support 204 in a second direction (a Y-axis direction). Third shakers 203 may vibrate the support 204 in a third direction (a Z-axis direction). In the embodiment illustrated in FIG. 7, the shakers 201 to 203 vibrate the support 204 in three directions intersecting each other, but the arrangement and number of the shakers 201 to 203 may be variously modified, and thus the vibration direction of the support 204 may be also changed.

Each of electronic devices 210 and 220 fixed to the support 204 may include one or more cameras 211, 212 and 221. In an embodiment illustrated in FIG. 7, first electronic device 210 may include a first camera 211 and a second camera 212 which are different in at least one of an angle of view, a number of pixels, an aperture value and a focal length. Second electronic device 220 may include only one camera 221. The first electronic device 210 and the second electronic device 220 may include flashes 213 and 222, respectively.

The test equipment 200 includes a computer device 205, and the shakers 201 to 203 may vibrate depending on the setting of the computer device 205. As described above with reference to FIGS. 4 through 6, operating frequencies of the shakers 201 to 203 may be determined by the imaging environment selected from the database by the computer device 205. For example, in Table 1 described above, the operating frequency of the shakers 201 to 203 when the nighttime walking situation is selected as the imaging environment may be greater than the operating frequency of the shakers 201 to 203 when the situation of standing indoors is selected as the imaging environment.

The computer device 205 may also determine the illumination of the space in which the test equipment 200 is installed. As described above with reference to FIGS. 4 to 6, the computer device 205 may determine at least one of brightness and color temperature of the illumination with reference to the imaging environment selected from the database. The computing device 205 may control test equipment 200 to control lighting devices so that the imaging environment is at determined brightness and color temperatures.

When the imaging environment is selected, and the illumination and the operating frequencies of the shakers 201 to 203 depending on the imaging environment are selected, the electronic devices 210 and 220 may image a subject 300. For example, the subject 300 may include a first test chart 310 and a second test chart 320. The first test chart 310 and the second test chart 320 may be the same. While the electronic devices 210 and 220 image the subject, image stabilizers mounted in the electronic devices 210 and 220, respectively, may be activated.

Even when different electronic devices 210 and 220 image the same test charts 310 and 320 in the same imaging environment, resultant images may have different qualities due to a difference in the cameras 211, 212 and 221 and the image stabilizer mounted on the electronic devices 210 and 220, respectively. The computer device 205 may calculate evaluation scores for a plurality of preset evaluation items using resultant images output from the electronic devices 210 and 220, respectively. The computer device 205 may evaluate the performance of the cameras 211, 212 and 221 and/or the image stabilizer mounted in the electronic devices 210 and 220 using the evaluation scores. According to embodiments, the performance evaluation task may also be executed a plurality of times while changing the imaging environment.

Next, referring to FIG. 8, test equipment 400 according to an embodiment may include a plurality of shakers 401 to 403 and a support 404. The test equipment 400 may be similar to that described with reference to FIG. 7. The shakers 401 to 403 may vibrate the support 404 in three axial directions. An electronic device 410 is fixed to the test equipment 400, and the test equipment 400 may be linked with a computer device 405.

The electronic device 410 includes a plurality of cameras 411 and 412, a flash 413, and the like, and the cameras 411 and 412 may be different in at least one of an angle of view, a number of pixels, an aperture value and a focal length. When the computer device 405 selects one of imaging environments stored in a database, operating frequencies of the shakers 401 to 403, the illumination of a space in which the test equipment 400 is installed, and the like may be determined depending on modeling information of the selected imaging environment. Alternatively, the flash 413 included in the electronic device 410 may be turned-on according to embodiments.

The computer device 405 may evaluate the performance of the electronic device 410 by analyzing a resultant image of the electronic device 410 imaging and outputting a test chart 510 in different imaging environments. In addition, the computer device 405 analyzes images captured by the first camera 411 and the second camera 412, respectively, and in a case in which the same image stabilizer is applied, performances of the first camera 411 and the second camera 412 may also be compared and evaluated.

Figure 9:
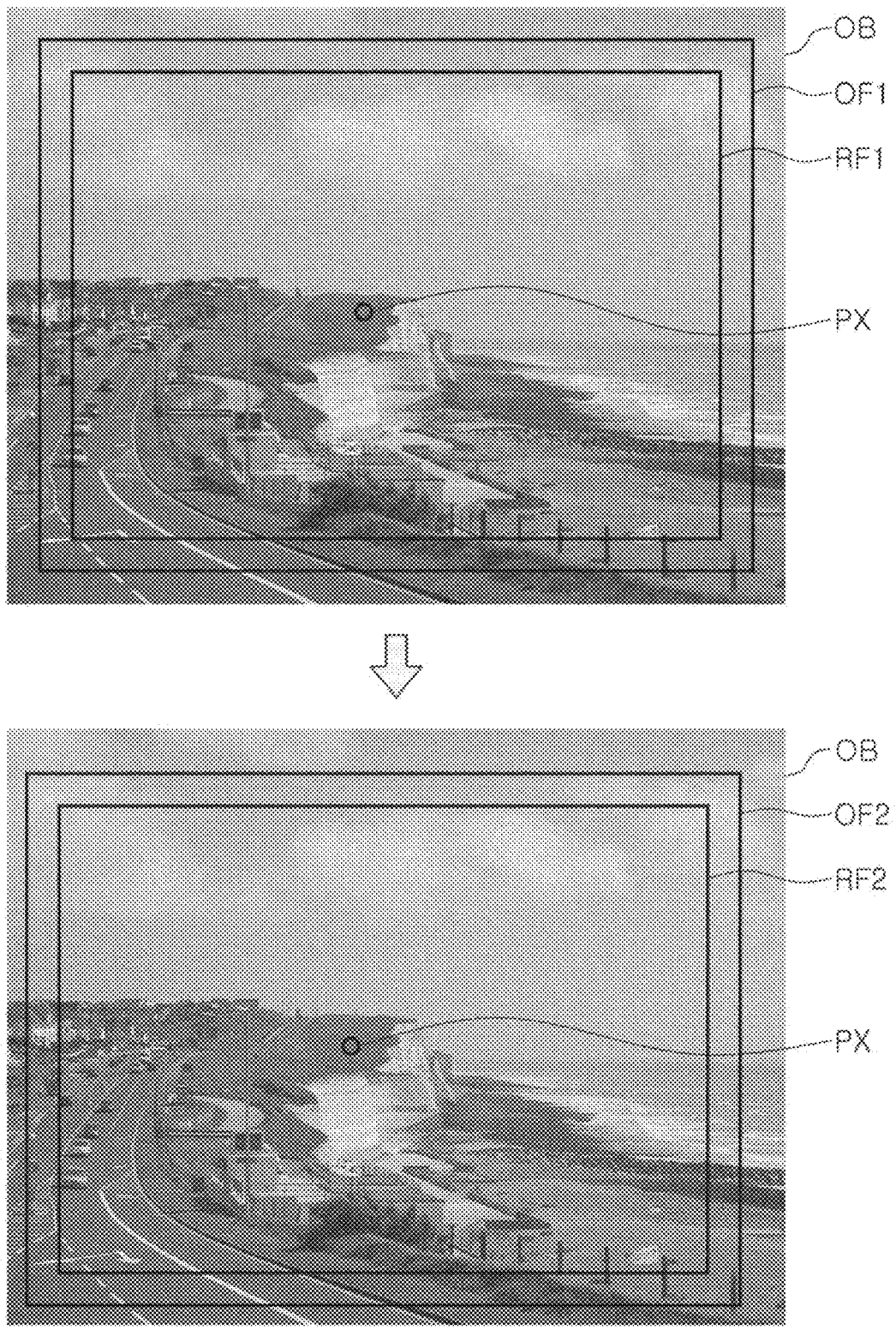
FIGS. 9 and 10 are diagrams illustrating a method of determining shaking of a resultant image in a method of evaluating performance of an electronic device according to an embodiment.
Figure 10:
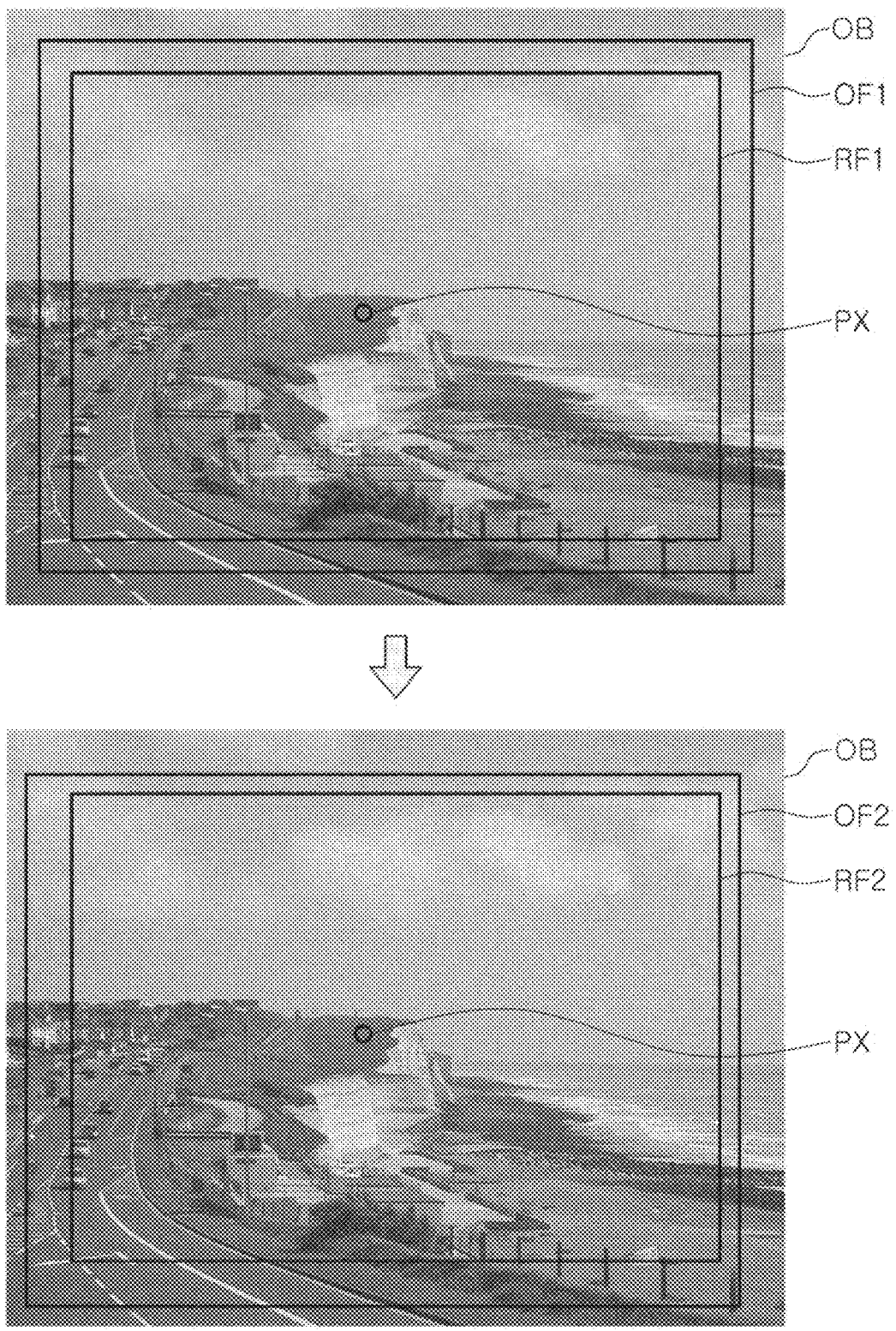

FIGS. 9 and 10 are diagrams illustrating a method of determining a shaking of a resultant image in a method of evaluating performance of an electronic device according to an embodiment.

Referring to FIGS. 9 and 10, resultant images may be video images including a plurality of image frames F1 and F2. In embodiments illustrated in FIGS. 9 and 10, the resultant images may include first and second image frames RF1 and RF2 in order, and the first and second image frames RF1 and RF2 may be generated by partially cropping regions of first and second image frames OF1 and OF2 of original images, respectively.

The first and second image frames OF1 and OF2 of the original image are images obtained by imaging at least a portion of a subject OB, and may be larger than the image frames RF1 and RF2 of the resultant image. In the embodiments illustrated in FIGS. 9 and 10, it is assumed that shake occurs to the lower left, which corresponds to a case in which resultant images are generated by cameras of different specifications and/or different image stabilizers.

First, referring to FIG. 9, the second image frame OF2 may capture a lower left region of the subject OB than the first image frame OF1 in the original image by shaking toward the lower left. In an embodiment illustrated in FIG. 9, the second image frame RF2 of the resultant image may also appear to have imaged the lower left region of the subject OB than the first image frame RF1, and thus, there is a great change in coordinates of pixels PX included in the first and second image frames RF1 and RF2 of the resultant image.

Next, referring to FIG. 10, the second image frame OF2 may capture a lower left region of the subject OB than the first image frame OF1 in the original image by shaking toward the lower left. In the case of an embodiment illustrated in FIG. 10, the image stabilizer employed in the electronic device operates so that an area of the subject OB included in the second image frame RF2 of the resultant image may be substantially the same as an area of the subject OB included in the first image frame RF1. Therefore, the change in coordinates of pixels PX included in the first and second image frames RF1 and RF2 of the resultant image may appear smaller than in the embodiment illustrated in FIG. 9.

In the embodiments illustrated in FIGS. 9 and 10, the pixels PX may move depending on a predetermined vibration frequency in the image frames RF1 and RF2 included in the resultant image. In a case in which the performance of the image stabilizer is relatively high, the vibration frequency of the pixels PX may have a value that is similar to or less than that of the operating frequency of the shakers included in the test equipment. In a case in which the performance of the image stabilizer is insufficient, the vibration frequency of the pixels PX may appear higher than the operating frequency of the shakers included in the test equipment.

The test equipment utilizes the coordinate change and the vibration frequency identified from the pixels PX as evaluation items, to determine that the performance of the electronic device outputting the resultant image according to the embodiment illustrated in FIG. 10 is superior to that of the electronic device outputting the resultant image according to the embodiment of FIG. 9. As an example, the test equipment may evaluate the performance of the electronic device, based on a coordinate deviation indicating the magnitude of a coordinate change of the pixels PX appearing in the image frames RF1 and RF2 of the resultant image, a variance value of the coordinate change of the pixels PX, the vibration frequency identified from the pixels PX, and the like.

In an example, the coordinate deviation may be calculated according to the following equation 1. In Equation 1, (X1, Y1) is pixel coordinates in the first image frame RF1, and (X2, Y2) is pixel coordinates in the second image frame RF2 after the first image frame RF1.

$$\sqrt{(X1-X2)^2+(Y1-Y2)^2} \quad \text{[Equation 1]}$$

The variance value may be expressed as a standard deviation or the like, and may be calculated by accumulating the coordinate change of the pixel. When the standard deviation is close to zero, the camera and/or the image stabilizer included in the electronic device may be evaluated as effectively compensating for the shake. On the other hand, if the standard deviation is relatively great, the image stabilizer may be evaluated as not effectively compensating for the shake.

The test equipment may respectively obtain measurement values for the evaluation items, for example, the coordinate deviation, the standard deviation, and the vibration frequency, from the image frames RF1 and RF2 of the resultant image. In addition, the measurement values for the evaluation items may be respectively compared with the first reference value and the second reference value preset for each of the evaluation items. Depending on the comparison result, the test equipment may assign an evaluation score, for each evaluation item, to the electronic device that outputs the resultant image.

The first reference value and the second reference value may correspond to a lowest score and a highest score that the evaluation score may have in each of the evaluation items, respectively. The first reference value may be determined under worst conditions settable by the test equipment, for example, under conditions in which the shakers are turned on and the image stabilizer of the electronic device is turned off. The second reference value may be determined under the best conditions settable by the test equipment, for example, conditions in which the shakers and the image stabilizer of the electronic device are all turned off.

TABLE 2

| Evaluation Item | Shaker | Image Stabilizer | Evaluation Score | Remarks |
|---|---|---|---|---|
| Coordinate Deviation | Turned-off | Turned-off | 100 | Best Condition |
| | Turned-on | Turned-off | 0 | Worst Condition |
| Standard Deviation | Turned-off | Turned-off | 100 | Best Condition |
| | Turned-on | Turned-off | 0 | Worst Condition |
| Vibration Frequency | Turned-on | Turned-off | 100 | Best Condition |
| | Turned-on | Turned-off | 0 | Worst Condition |

For example, in Table 2, in the worst conditions in which the shaker is turned on and an image stabilizer is turned off, the first reference value corresponding to a lowest score (0 point) for each of the evaluation items may be determined using the resultant image output by the electronic device. In the best conditions in which the shaker and the image stabilizer are turned off together, the second reference value corresponding to a highest score (100 points) for each of the evaluation items may be determined using the resultant image output by the electronic device. Hereinafter, a method of determining the first reference value and the second reference value for the evaluation item will be described in more detail with reference to FIGS. 11A and 11B.

FIGS. 11A and 11B are diagrams illustrating a method of evaluating performance of an electronic device according to an embodiment.

FIGS. 11A and 11B are graphs illustrating a method of obtaining a first reference value and a second reference value with respect to a standard deviation among items indicating coordinate changes of pixels included in a resultant image. First, FIG. 11A may be a graph illustrating a change in coordinates of pixels appearing in a resultant image output by the electronic device while the image is taken under the best conditions in which both the shaker and the image stabilizer of the electronic device are turned off. In FIG. 11A, a maximum value of the coordinate change of the pixel may be about 1.5, and the standard deviation calculated by accumulating the coordinates of pixels measured in respective frames may be less than one. Therefore, it may be determined that both the shaker and the camera are appropriately initialized, and at the same time, the value of the standard deviation obtained in FIG. 11A may be determined as the highest score such that the standard deviation may have, for example, the second reference value.

FIG. 11B may be a graph illustrating a change in coordinates of pixels appearing in a resultant image captured under worst conditions in which the shaker is turned on and the image stabilizer of the electronic device is turned off. Referring to the graph illustrated in FIG. 11B, the coordinate change of the pixel may appear relatively large in the resultant image. For example, in FIG. 11B, a maximum value of the coordinate change of the pixel may be 130 or more, and the standard deviation calculated by accumulating the coordinates of the pixels measured in respective image frames may be 40 or more. In the performance evaluation method according to an embodiment, the value of the standard deviation obtained in FIG. 11B may be determined as the first reference value of the standard deviation.

Similar to the manner described with reference to FIGS. 11A and 11B, first and second reference values for other evaluation items, for example, the coordinate deviation and vibration frequency of pixels may be determined. While the shaker and the image stabilizer of the electronic device are activated depending on operating conditions of a selected imaging environment, the test equipment may determine evaluation scores for the evaluation items by comparing the coordinate deviation, standard deviation and vibration frequency of pixels acquired from the resultant image output by the electronic device with the first reference value and the second reference value.

Figure 12A:
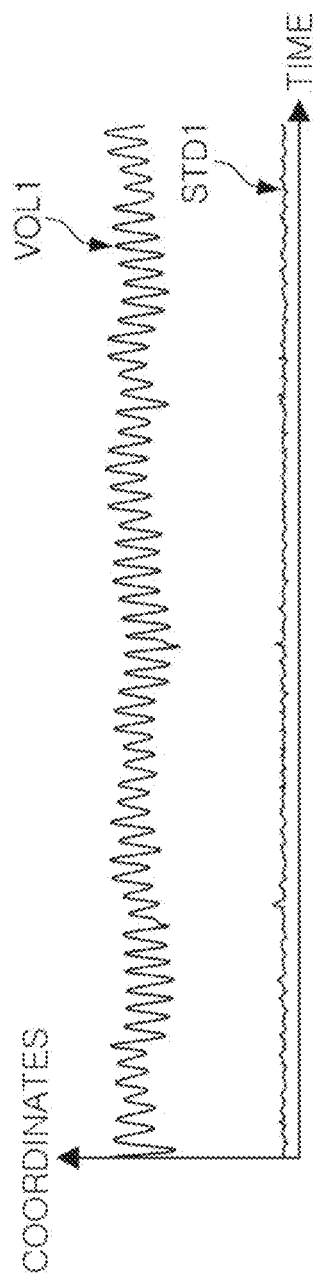
FIGS. 12A and 12B are diagrams illustrating a method of evaluating performance of an electronic device according to an embodiment.
Figure 12B:
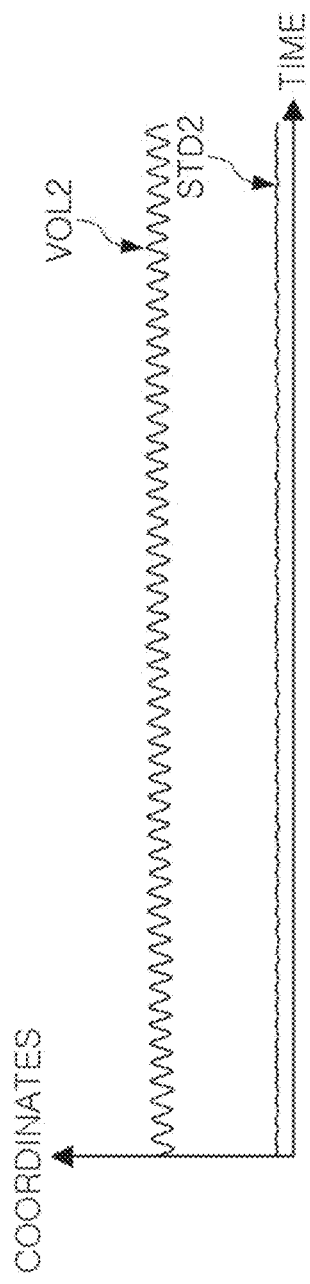

FIGS. 12A and 12B are diagrams illustrating a method of evaluating performance of an electronic device according to an embodiment.

FIGS. 12A and 12B may be graphs illustrating coordinate changes of pixels measured from a resultant image output by an electronic device while a shaker and an image stabilizer of the electronic device are turned on. As described above, the shaker may generate vibration at an operating frequency determined depending on an imaging environment selected by test equipment.

For example, FIG. 12A may be a graph illustrating a coordinate deviation VOL1 and a standard deviation STD1 measured from coordinate changes that appear in pixels of a resultant image output by a first electronic device. FIG. 12B may be a graph illustrating a coordinate deviation VOL2 and a standard deviation STD2 measured from coordinate changes that appear in pixels of a resultant image output by a second electronic device different from the first electronic device. Referring to FIGS. 12A and 12B, the coordinate deviation VOL2 of the pixels may vary depending on a vibration frequency determined by an operating frequency of the shaker included in the test equipment.

For example, the first electronic device and the second electronic device may include image stabilizers and cameras having different specifications. In embodiments illustrated in FIGS. 12A and 12B, the shake correction performance of the second electronic device may be evaluated to be relatively superior to the shake correction performance of the first electronic device.

On the other hand, in an embodiment, in addition to the coordinate change and/or vibration frequency of the pixels measured from the image frames included in the resultant image, the degree to which an original image is cropped in a process of correcting shaking by an image stabilizer of the electronic device may also be considered as an evaluation item. For example, the test equipment may calculate a size difference between the original image generated by the electronic device and a resultant image obtained by correcting shaking by the image stabilizer, which may be applied as an evaluation item. Hereinafter, a description thereof will be provided with reference to FIGS. 13 to 18.

FIGS. 13 to 18 are diagrams illustrating a performance evaluation method according to an embodiment.

FIGS. 13 to 18 illustrate the size difference between an original image before an image stabilizer compensates for shaking and a resultant image after compensating for shaking. In embodiments described with reference to FIGS. 13 to 18, an electronic device may include EIS as an image stabilizer.

Figure 13:
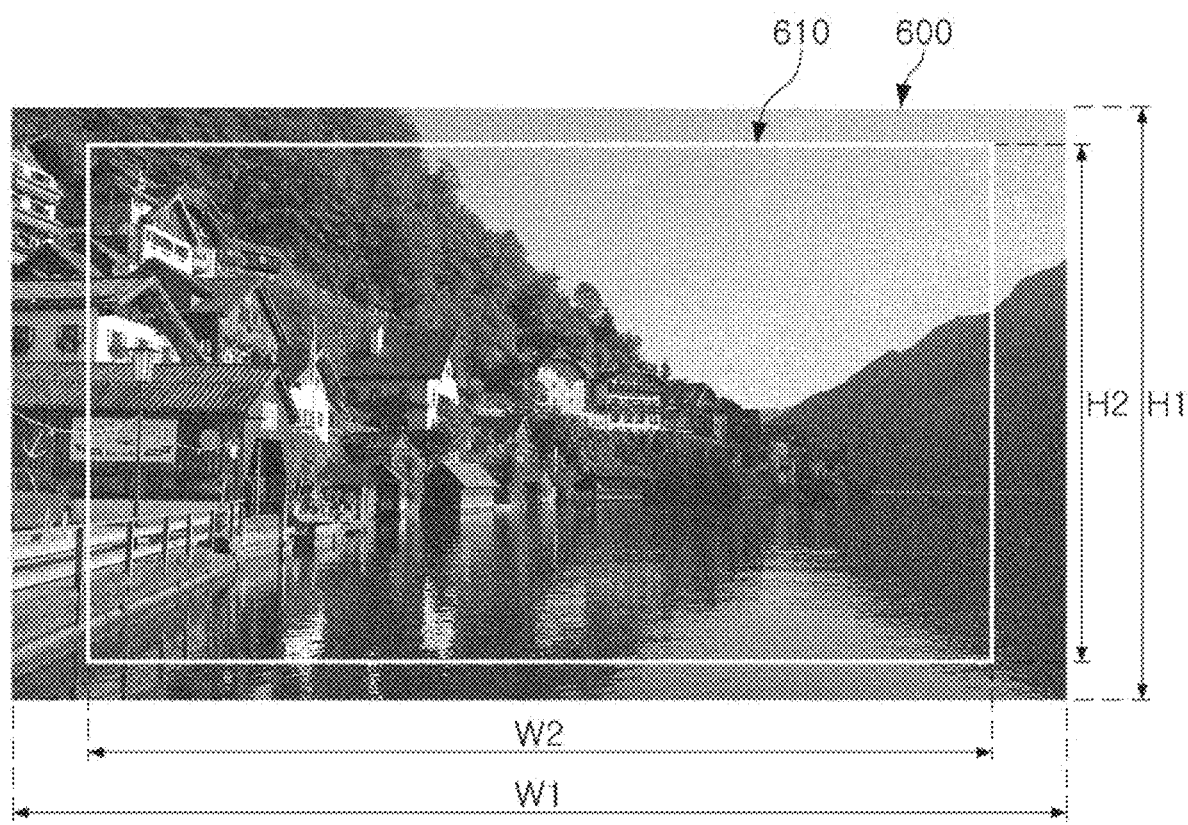
FIGS. 13 to 18 are diagrams illustrating a method of evaluating performance of an electronic device according to an embodiment.
Figure 14:
Figure 15:
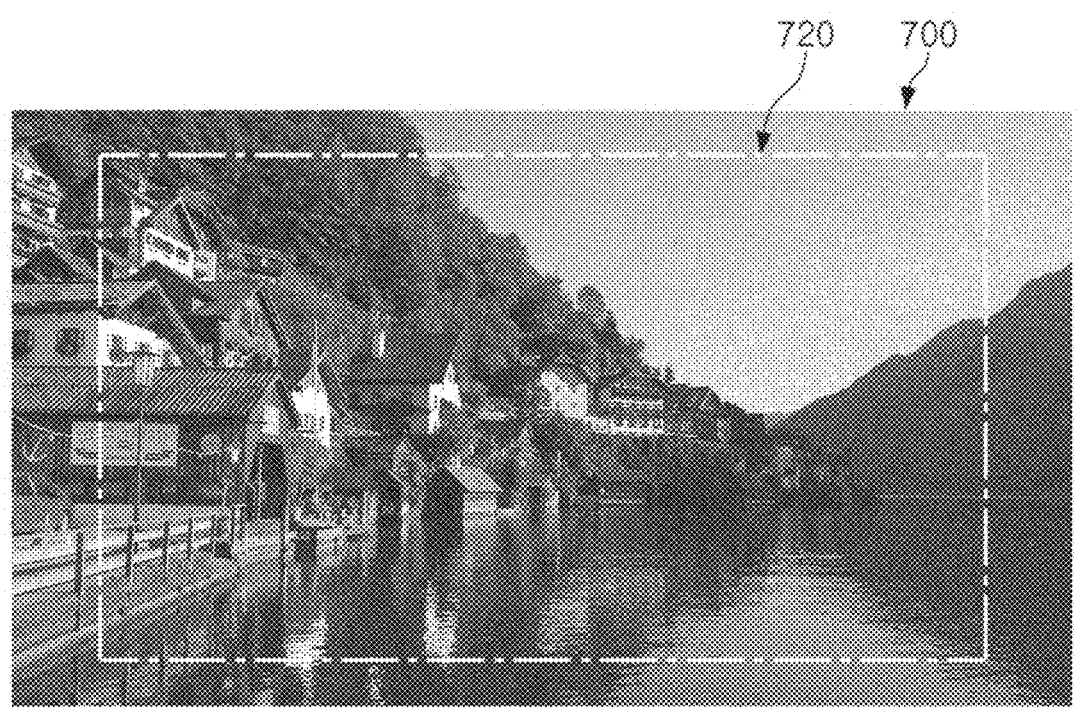
Figure 16:
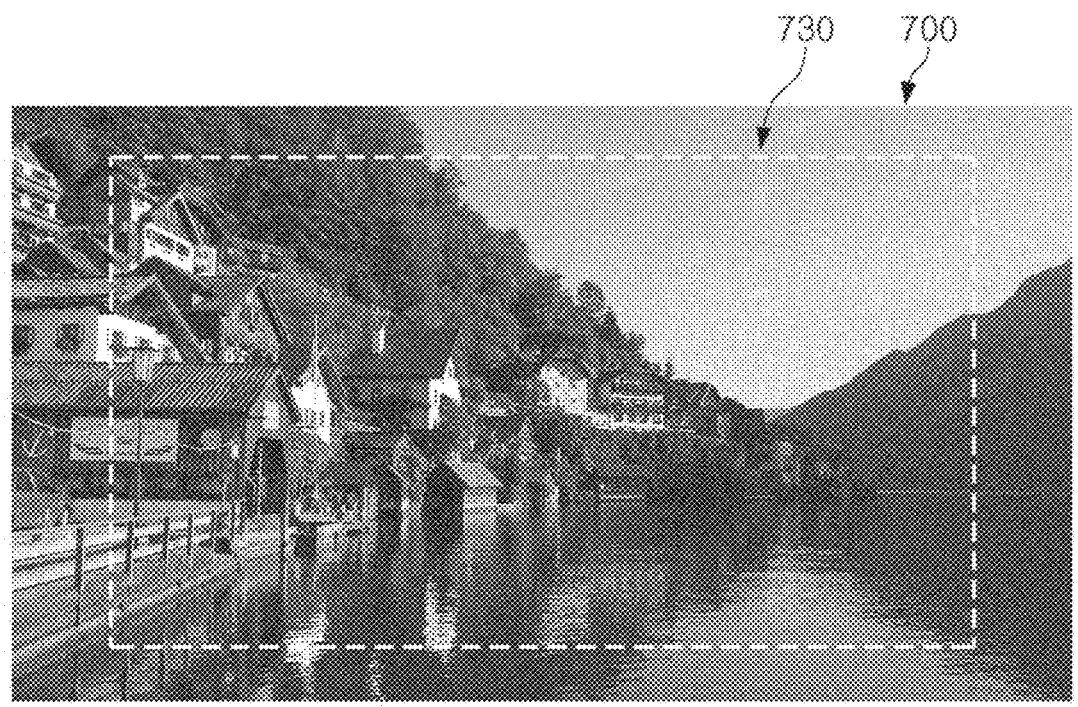
Figure 17:
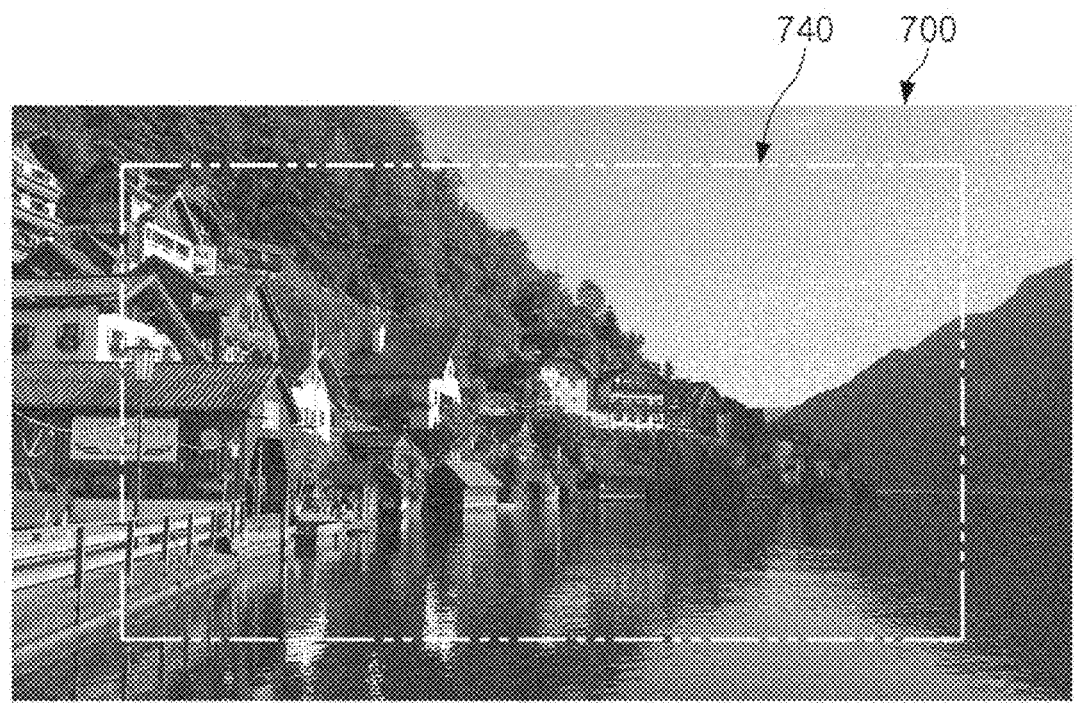

First, referring to FIG. 13, an image stabilizer of the electronic device may generate a resultant image 610 by cropping an original image 600. Therefore, a first height H1 and a first width W1 of the original image 600 may be greater than a second height H2 and a second width W2 of the resultant image 610, respectively.

In a case in which a plurality of electronic devices adopt EIS as the image stabilizer, the size difference between the original image 600 and the resultant image 610 may vary depending on setting of the EIS and/or the electronic device or the specification of a camera. A relatively large difference in size between the original image 600 and the resultant image 610 may correspond to a case in which a relatively large area of the original image 600 is sacrificed to compensate for shaking. Therefore, as the size difference between the original image 600 and the resultant image 610 is reduced, a measurement value for the evaluation item corresponding to the size difference may increase. In an example, an evaluation item corresponding to the size difference may be defined as a region of interest (ROI).

In an example, the ROI corresponding to the difference in size between the original image 600 and the resultant image 610 may have a trade-off relationship with a performance of compensating for shaking. For example, the shake may be effectively compensated by cutting out a relatively large area of the original image 600, but the size of the resulting image 610 may be greatly reduced. On the other hand, in a case in which the image stabilizer is set to significantly reduce the size difference between the original image 600 and the resultant image 610, the effect of compensating for shaking may be reduced.

Therefore, in an embodiment, in addition to the size of the ROI corresponding to the size difference between the original image 600 and the resultant image 610, coordinate deviation, standard deviation, vibration frequency and the like appearing in pixels included in image frames of the resultant image 610 may be selected as evaluation items. A predetermined weight may be respectively assigned to the evaluation items. The tradeoff between the size difference between the original image 600 and the resultant image 610 and the shake correction performance may be effectively considered by calculating a performance index indicating the performance of the image stabilizer by multiplying evaluation scores for the respective evaluation items by a predetermined weight and summing the evaluation scores. The weights assigned to the evaluation items, respectively, may be variously modified according to embodiments.

Next, referring to FIGS. 14 to 17, when imaging the same subject with four different electronic devices, the size of resultant images 710 to 740 may vary depending on performance of cameras included in the electronic devices and/or image stabilization functions applied to an original image by the electronic devices. In embodiments illustrated in FIGS. 14 to 17, the size of first resultant image 710 generated by a first electronic device is the largest, and the size of fourth resultant image 740 generated by a fourth electronic device is the smallest.

Figure 18:
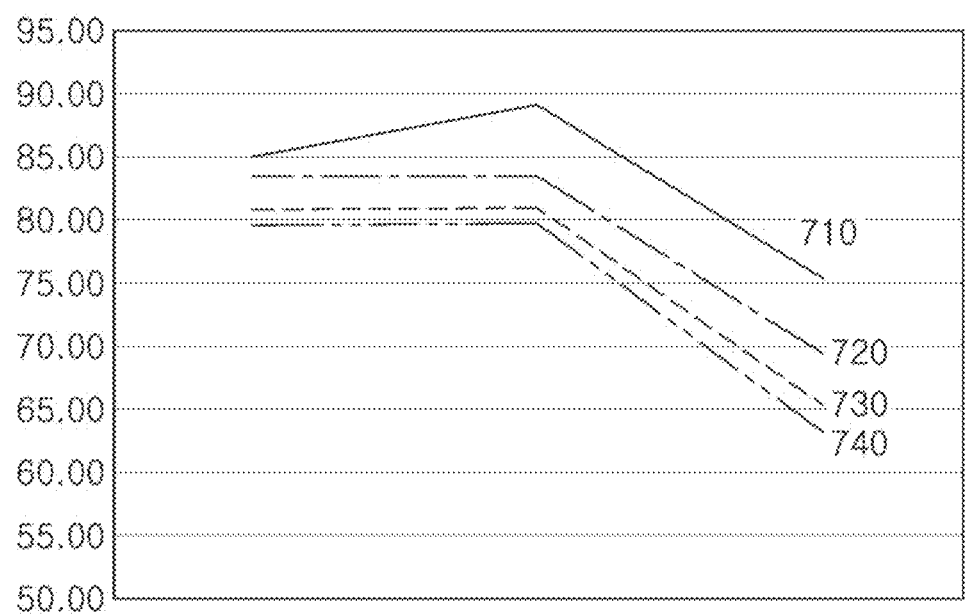

FIG. 18 illustrates sizes of the first to fourth resultant images 710 to 740 output by the first to fourth electronic devices. The graph of FIG. 18 illustrates ratios of a height, a width and an area of each of the first to fourth resultant images 710 to 740 with respect to a height, a width and an area of the original image 700.

Table 3 below illustrates measurement values obtained for respective evaluation items from the resultant images 710 to 740 output by the first to fourth electronic devices, respectively.

TABLE 3

| Device | Imaging Environment | | Measurement Values of Evaluation Items | | | | | Evaluation Score |
|---|---|---|---|---|---|---|---|---|
| | Shaker (Hz) | Brightness (1x) | STD (30%) | VOL (30%) | FREQ (30%) | ROI (10%) | Sub-score | |
| First Electronic Device | 2 | 1000 | 70.6 | 71.1 | 77.7 | 85 | 74.3 | 71.3 |
| | 2 | 66 | 71.7 | 70.1 | 57.5 | 85 | 68.3 | |
| Second Electronic Device | 2 | 1000 | 33.3 | 56.7 | 81.0 | 83.2 | 59.7 | 63.1 |
| | 2 | 66 | 66.4 | 69.5 | 58.5 | 83.2 | 66.6 | |
| Third Electronic Device | 2 | 1000 | 74.1 | 74.3 | 95.1 | 80.7 | 81.1 | 82.7 |
| | 2 | 66 | 82 | 81.9 | 90.1 | 80.7 | 84.3 | |
| Fourth Electronic Device | 2 | 1000 | 51.8 | 58.9 | 86.4 | 79.5 | 67.2 | 64.1 |
| | 2 | 66 | 40 | 36.6 | 100 | 79.5 | 61 | |

Referring to Table 3, it can be confirmed that each of the first to fourth electronic devices is tested in first and second imaging environments. Operating frequencies of the shaker in the first and second imaging environments are the same, and the brightness of the illumination may be different. The first imaging environment has a brighter operating condition than the second imaging environment. For example, a first imaging condition may correspond to an environment in which an image is taken while walking outdoors during the day, and a second imaging condition may correspond to an environment in which an image is taken while walking outdoors at night.

A plurality of evaluation items may be given a predetermined weight. In an embodiment illustrated in Table 3, a weight of 30% is assigned to each of a standard deviation (STD), a coordinate deviation (VOL) and a vibration frequency (FREQ) of pixels calculated in a resultant image, and a weight of 10% may be assigned to ROI corresponding to a size difference of each of the original image 700 and the resultant images 710 to 740.

In the embodiment illustrated in Table 3, after taking the image under the first imaging condition and the second imaging condition while respectively placing the first to fourth electronic devices on the shaker, measurement values for the plurality of evaluation items are acquired, thereby evaluating performance of the image stabilizer for compensating for shaking of an image. A first sub-score may be calculated by assigning a weight to the measurement values for the plurality of evaluation items acquired under the first imaging condition, and a second sub-score may be calculated by assigning a weight to the measurement values for the plurality of evaluation items obtained under the second imaging condition. An evaluation score for evaluating the performance of the image stabilizer employed in each of the first to fourth electronic devices may be determined by an average of the first sub score and the second sub score.

Among the plurality of evaluation items, the first electronic device may receive a highest score and the fourth electronic device may receive a lowest score, in the region of interest (ROI) representing the size difference between the original image 700 and the resultant images 710 to 740. In an embodiment described with reference to Table 3, the ROI may be determined by a height value. For example, as illustrated in FIGS. 13 to 17, the size difference between the first resultant image 710 output by the first electronic device and the original image 700 may be smallest, and the size difference between the fourth resultant image 740 output by the fourth electronic device and the original image 700 may be largest.

In an embodiment, the test equipment is configured by using a shaker capable of forcibly generating vibration, and performance of the image stabilizer adopted in the electronic device may be evaluated using the resultant image output by the electronic device which is fixed to the test equipment and vibrates together. The electronic device fixed to the test equipment may capture an image in a state of being exposed to imaging environments pre-modeled and stored in a database. The imaging environment may be modeled based on operating conditions such as the degree of shaking, brightness of illumination, color temperature or the like. When the electronic device outputs the resultant image while the test equipment is vibrating, the test equipment acquires measurement values for a plurality of preset evaluation items from the resultant image, thereby numerically evaluating the performance of the image stabilizer included in the electronic device.

In addition, in an embodiment, the reference values for the plurality of evaluation items may be set while turning on and off the shaker in a state in which the image stabilizer is turned off. The test equipment may determine evaluation scores for the evaluation items by obtaining measurement values for the plurality of evaluation items from the resultant image and comparing the measurement value and the reference value in each of the evaluation items. Therefore, in the electronic device including a camera, the performance of the image stabilizer adopted to compensate for deterioration of the image quality due to shaking may be numerically evaluated.

As set forth above, according to an embodiment, an electronic device including a camera may be mounted on test equipment including a shaker capable of generating vibration, and may image a predetermined subject, thereby obtaining a resultant image. Shaking caused by vibration of the shaker may be reflected in the resultant image, and the electronic device may output a resultant image obtained by significantly reducing shaking using a motion compensation algorithm. Evaluation scores of a plurality of evaluation items may be calculated from the resultant image, and the evaluation scores may be summed by assigning predetermined weights to the evaluation scores, thereby quantitatively evaluating the performance of a camera and/or a motion compensation algorithm. Accordingly, performance of a camera and/or a motion compensation algorithm may be objectively evaluated.

While embodiments have been illustrated and described above, it will be apparent to those skilled in the art that modifications and variations could be made without departing from the scope of the present disclosure as defined by the appended claims.

What is claimed is:

1. A method of evaluating performance of an electronic device including a camera, the method comprising:
setting, by at least one processor, operating conditions of at least one shaker by accessing a database associating a plurality of imaging environments with the operating conditions;
acquiring, by the at least one processor, images of a subject from the electronic device, the images being captured while the at least one shaker is operating according to the operating conditions;
identifying, by the at least one processor, evaluation scores that correspond to a plurality of characteristics for each of the images;
identifying, by the at least one processor, a first reference value corresponding to a lowest evaluation score and a second reference value corresponding to a highest evaluation score; and
identifying, by the at least one processor, the performance of the electronic device compensating for the operating conditions based on the first reference value, the second reference value and the evaluation scores.

2. The method of claim 1, wherein the performance of the electronic device is identified by the at least one processor using a performance index indicating a weight for each of the evaluation scores.

3. The method of claim 1, wherein the performance of the electronic device is determined by the at least one processor by selecting two or more imaging environments from among the plurality of imaging environments and identifying an average of the evaluation scores corresponding to the two or more imaging environments.

4. The method of claim 1, wherein the plurality of characteristics comprises a first characteristic corresponding to a change in coordinates of pixels of image frames included in the images, and a second characteristic corresponding to a difference in size of the images and an original image.

5. The method of claim 4, wherein the images are captured by the electronic device while the electronic device uses an image stabilization function, and
wherein the image has been cropped by the electronic device from an original image.

6. The method of claim 5, wherein the evaluation scores for the second characteristic are identified by the at least one processor increase as a ratio of a cropped size of the image to an original size of the original image is increased.

7. The method of claim 4, further comprising evaluating, by the at least one processor, the performance of the electronic device using a performance index obtained by assigning a predetermined weight to each of the evaluation scores of for the first characteristic and the second characteristic and summing the evaluation scores,
wherein the predetermined weight assigned to the second characteristic is less than the predetermined weight given to the first characteristic.

8. The method of claim 4, wherein the first characteristic indicates at least one among a first coordinate change item corresponding to a magnitude of a coordinate change between pixels of a first image frame and pixels of a second image frame continuously included in the images, and a second coordinate change item corresponding to a variance of a coordinate difference in pixels of the first image frame and the second image frame.

9. The method of claim 4, wherein the first characteristic comprises a vibration characteristic corresponding to a vibration frequency appearing in pixels of image frames included in the images.

10. The method of claim 1, wherein the electronic device comprises a first electronic device and a second electronic device that is separate from the first electronic device, and
wherein performance of the first electronic device and performance of the second electronic device are evaluated using a first image obtained by the first electronic device and a second image obtained by the second electronic device.

11. The method of claim 10, wherein the first electronic device comprises a first camera, and the second electronic device comprises a second camera.

12. The method of claim 11, wherein the first camera is a first camera type and the second camera is the first camera type, and
wherein the first electronic device acquires the first image using a first image stabilization technique, and the second electronic device acquires the second image using a second image stabilization technique that is different from the first image stabilization technique.

13. The method of claim 11, wherein the first camera and the second camera are different in at least one among angles of view, numbers of pixels, aperture values, and focal lengths.

14. The method of claim 1, wherein the operating conditions indicate at least one among an operating frequency of the at least one shaker, and an illumination intensity and a color temperature of ambient light.

15. A method of evaluating performance of an electronic device including a camera that is configured to output a stabilized image by capturing an image of a subject with the camera using an image stabilization function, the method comprising:
setting, by at least one processor, imaging environments of the electronic device;
repeatedly implementing, by the at least one processor, the imaging environments in a test equipment including at least one shaker;
repeatedly controlling, by the at least one processor, the electronic device to output stabilized images using the camera and the image stabilization function in the imaging environments; and
evaluating, by the at least one processor, performance of the electronic device by comparing a size of an original image with a size of one of the stabilized images,
wherein the evaluating of the performance comprises:
identifying, by the at least one processor, a first reference value for each of a plurality of characteristics using a first image output by the electronic device while the at least one shaker is turned on and the image stabilization function is turned off;
identifying, by the at least one processor, a second reference value for each of the plurality of characteristics using a second image output by the electronic device while the at least one shaker and the image stabilization function are turned off;
acquiring, by the at least one processor, a measurement value for each of the plurality of characteristics using the stabilized image output by the electronic device while the at least one shaker and the image stabilization function are turned on; and
evaluating, by the at least one processor, the performance of the electronic device by comparing the measurement value with the first reference value and the second reference value for each of the plurality of characteristics.

16. The method of claim 15, wherein image stabilization performance of the image stabilization function is evaluated by comparing the original image and the stabilized image corresponding to one of the imaging environments.

17. A method of evaluating performance of an electronic device based on a stabilized image output by the electronic device, the method comprising:
  acquiring, by at least one processor, the stabilized image, the stabilized image comprising a plurality of frames and being output by the electronic device using an image stabilization function;
  identifying, by the at least one processor, a coordinate change and a vibration frequency of at least one pixel included in the plurality of frames, and a size difference between the plurality of frames and image frames of an original image;
  converting, by the at least one processor, each of the coordinate change, the vibration frequency and the size difference into an evaluation score, the evaluation score being greater than or equal to a first reference value and less than or equal to a second reference value; and
  identifying, by the at least one processor, a performance index based on a predetermined weight corresponding to the evaluation score of each of the coordinate change, the vibration frequency and the size difference.

18. The method of claim 17, wherein the coordinate change comprises a coordinate deviation corresponding to a coordinate difference of at least one pixel included in a first image frame and a second image frame sequentially included in the plurality of frames of the stabilized image, and a variance value obtained by accumulating and identifying coordinate changes of the at least one pixel in the plurality of frames.

* * * * *